(12) United States Patent
Takeda et al.

(10) Patent No.: US 6,814,497 B2
(45) Date of Patent: Nov. 9, 2004

(54) OPTICAL FIBER CONNECTOR WITH FIBER END PROTECTOR

(75) Inventors: Jun Takeda, Tokyo (JP); Yuichi Koreeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/665,556

(22) Filed: Sep. 22, 2003

(65) Prior Publication Data

US 2004/0062489 A1 Apr. 1, 2004

(30) Foreign Application Priority Data

Sep. 27, 2002 (JP) ...................................... 2002/283622

(51) Int. Cl.[7] .............................................. G02B 6/38
(52) U.S. Cl. ......................................... 385/58; 385/71
(58) Field of Search ...................... 385/53–55, 58–60, 385/70, 71, 63–65, 83, 47, 95–98, 114, 136, 134, 137

(56) References Cited

U.S. PATENT DOCUMENTS 6,491,442 B1 * 12/2002 Murakami et al. ............ 385/58

FOREIGN PATENT DOCUMENTS

| JP | 200019354 | 1/2000 |
| JP | 2001208938 | 8/2001 |

* cited by examiner

Primary Examiner—Javaid H. Nasri
(74) Attorney, Agent, or Firm—Baker Botts L.L.P.

(57) ABSTRACT

An optical fiber connector (100), which is used for interconnecting ends of optical fibers (200) together with a splice device or a similar device, comprises a connector body (10) and a protector (50), which is movably or slidably held by the connector body (10). The connector body (10) is provided with an arranging portion (23), which is separated from and independent of the protector (50). The arranging portion (23) arranges the optical fibers (200) so that the arrangement of the optical fibers (200) falls within a single closed predetermined area in an XZ plane perpendicular to a Y-direction, wherein the single closed predetermined area has a first area size in the XZ plane. The protector (50) is provided with a front end surface (52a), which is formed with a second opening (54). The second opening (54) has a second area size in the XZ plane, which is larger than the first area size. When the optical fibers (200) are held by the optical fiber connector (100), the second opening (54) is never in contact with the optical fibers (200) even during the protector (50) is moved.

24 Claims, 9 Drawing Sheets

OPTICAL FIBER CONNECTOR WITH FIBER END PROTECTOR

This application claims priority to prior Japanese patent application JP 2002-283622, the disclosure of which is incorporated herein by reference.

BACKGROUND OF THE INVENTION

This invention relates to an optical fiber connector, which serves to hold optical fibers and to arrange the ends of the optical fibers.

Such an optical fiber connector is used for interconnection of optical fibers together with a mechanical splice device or a mating connector, as disclosed in JP-A 2001-208938 or JP-A 2000-19354. In either JP-A 2001-208938 or JP-A 2000-19354, an optical fiber connector has an arranging member, which is slidably held by a connector body of the optical fiber connector. The arranging member has a plurality of through holes, each of which has a diameter slightly larger than the outer diameter of the optical fiber and is used for suitably supporting and arranging the corresponding optical fiber. The splice device, which is referred to as an adapter in JP-A 2001-208938 or JP-A 2000-19354, has an H-like shaped portion which has two pairs of end portions.

Under a disconnected state, the arranging member projects from the front end of the connector body. The ends of the optical fibers are positioned within the through holes of the arranging member so that the arranging member protects the optical fiber ends. Upon a connected state of the optical fiber connector and the splice device, the arranging member is pressed by two end portions of the splice device and is retracted from the front end of the connector body so that the ends of the optical fibers are exposed and can be inserted into the splice device.

There is, however, a problem that foreign substances or contaminations might be frequently adhered to the ends of the optical fibers as explained below. Sometimes contaminations are adhered to the outer peripheries of the optical fibers when the ends of the optical fibers project from the arranging member. In this event, when the arranging member is moved forwards to hide the ends of the optical fibers, the contaminations are dropped or disposed on the inner surfaces of the through holes of the arranging member because of the small clearance between the outer peripheries of the optical fibers and the through holes. When the arranging member is moved backwards, such contaminations are pressed towards the outside of the arranging member by the ends of the optical fibers so that the contaminations are adhered to the ends of the optical fiber.

SUMMARY OF THE INVENTION

It is therefore an object of the present invention to provide an optical fiber connector which can prevent foreign substances or contaminations from being adhered to ends of optical fibers, for example, upon its connection to a splice device or an adapter.

This invention can be applicable to an optical fiber connector which is able to hold optical fibers and to arrange ends of the optical fibers. According to this invention, the optical fiber connector comprises:

a connector body, which has a front end portion defining a first opening and comprises supporting means for supporting the optical fibers so that the optical fibers extend in a predefined direction, wherein the supporting means is positioned within a single closed predetermined area in a predefined plane perpendicular to the predefined direction, and the single closed predetermined area has a first area size in the predefined plane; and a protector, which is movably held by the connector body and is provided with a front end surface, wherein: the front end surface is formed with a second opening; the second opening has in the predefined plane a second area size larger than the first area size; and the movable range of the protector is between a first position and a second position, the first position being a position where the protector is arranged in the first opening and is surrounding by the front end portion and where the front end surface of the protector projects from the front end portion through the first opening, the second position being a position where the front end surface of the protector is retracted from the front end portion through the first opening.

DESCRIPTION OF PREFERRED EMBODIMENTS

With reference to FIGS. 1 to 8, an optical fiber connector 100 according to an embodiment of the present invention is used for interconnection of ends of optical fibers 200, e.g., together with a mechanical splice device, as disclosed in JP-A 2001-208938 or JP-A 2000-19354. The illustrated optical fiber connector 100 is able to hold four fiber tapes, each of which is comprised of eight optical fibers 200. In other words, the optical fiber connector 100 of the present embodiment is able to hold thirty-two optical fibers 200. However, the present invention does not limited thereto, and the optical fiber connector may have any numbers of optical fibers.

As shown in FIGS. 1 and 4 to 7, the optical fiber connector 100 comprises a connector body 10 as a main part. As especially shown in FIG. 7, the connector body 10 is comprised of front and rear parts 30, 20 and supplementary pieces 40.

Figure 1:
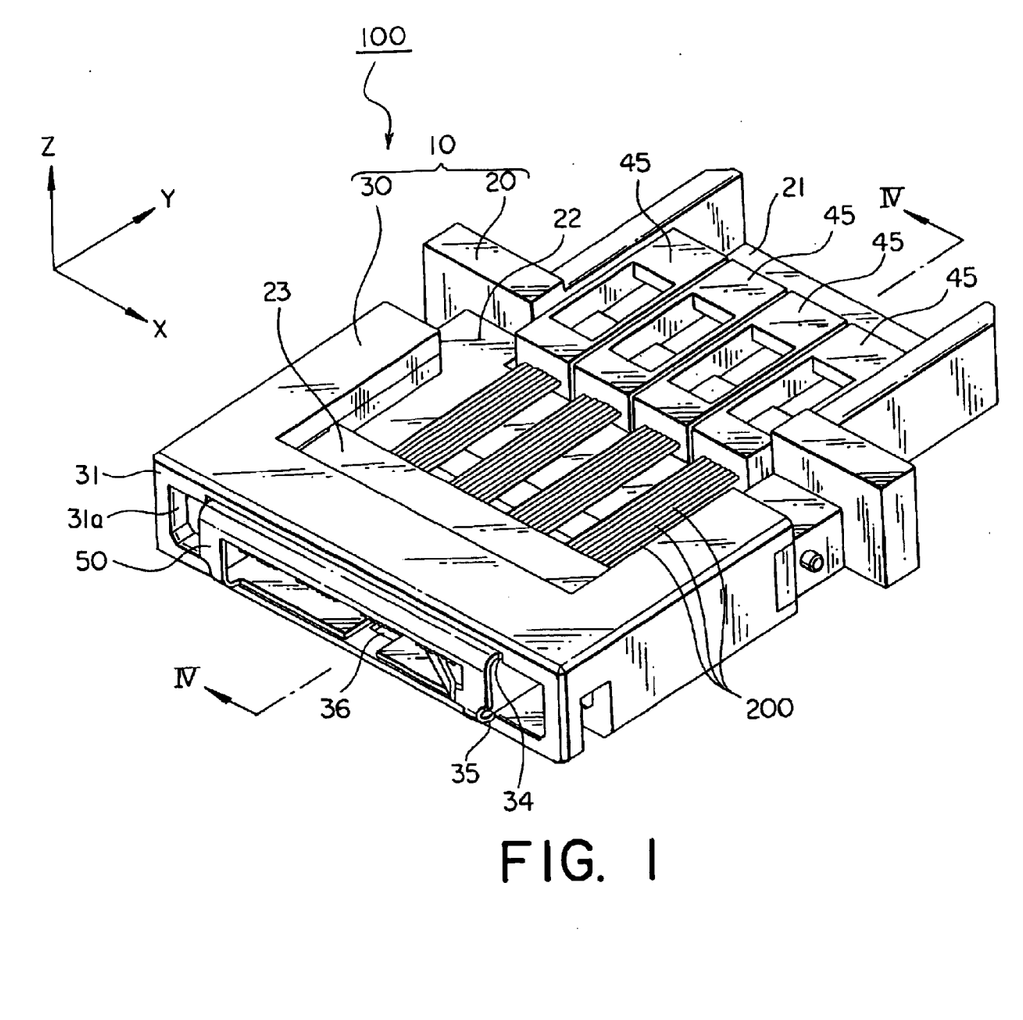
FIG. 1 is a perspective view from the above, showing an optical fiber connector according to an embodiment of the present invention.
Figure 6:
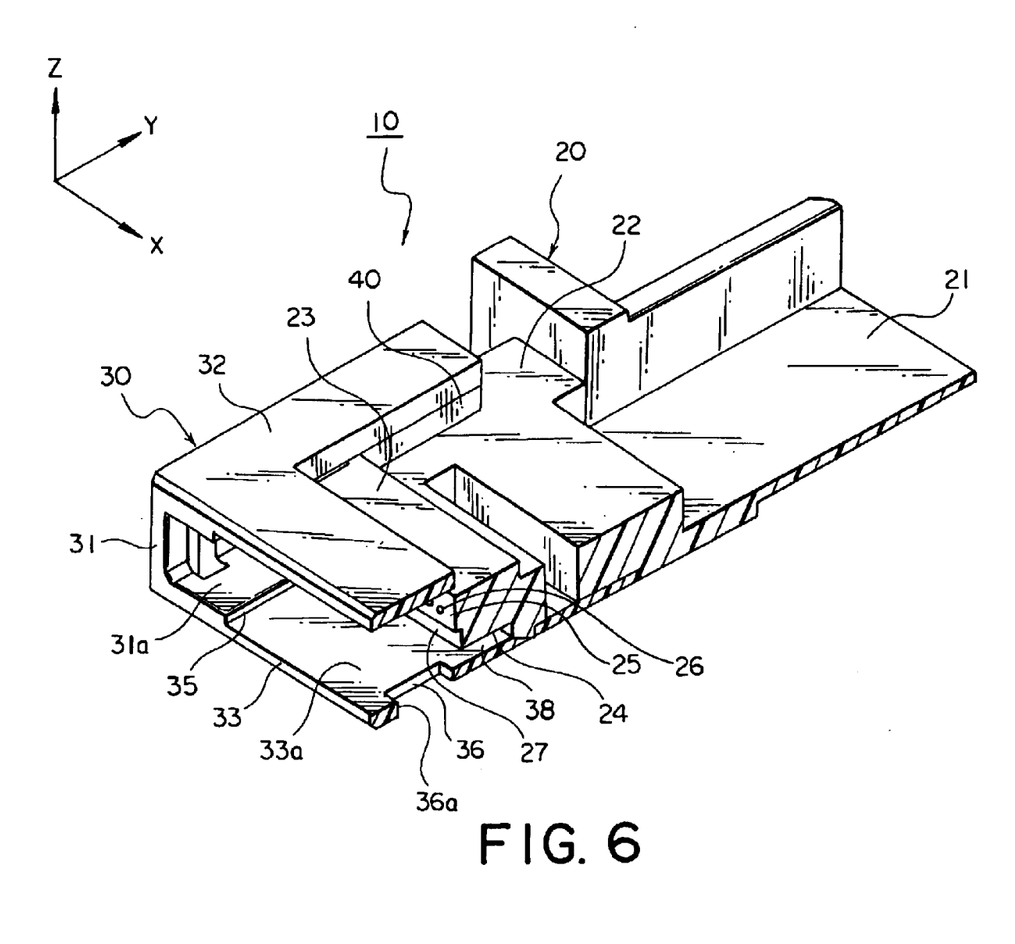
FIG. 6 is a cutaway, perspective view showing the connector body of FIG. 5, taken along lines VI—VI.
Figure 7:
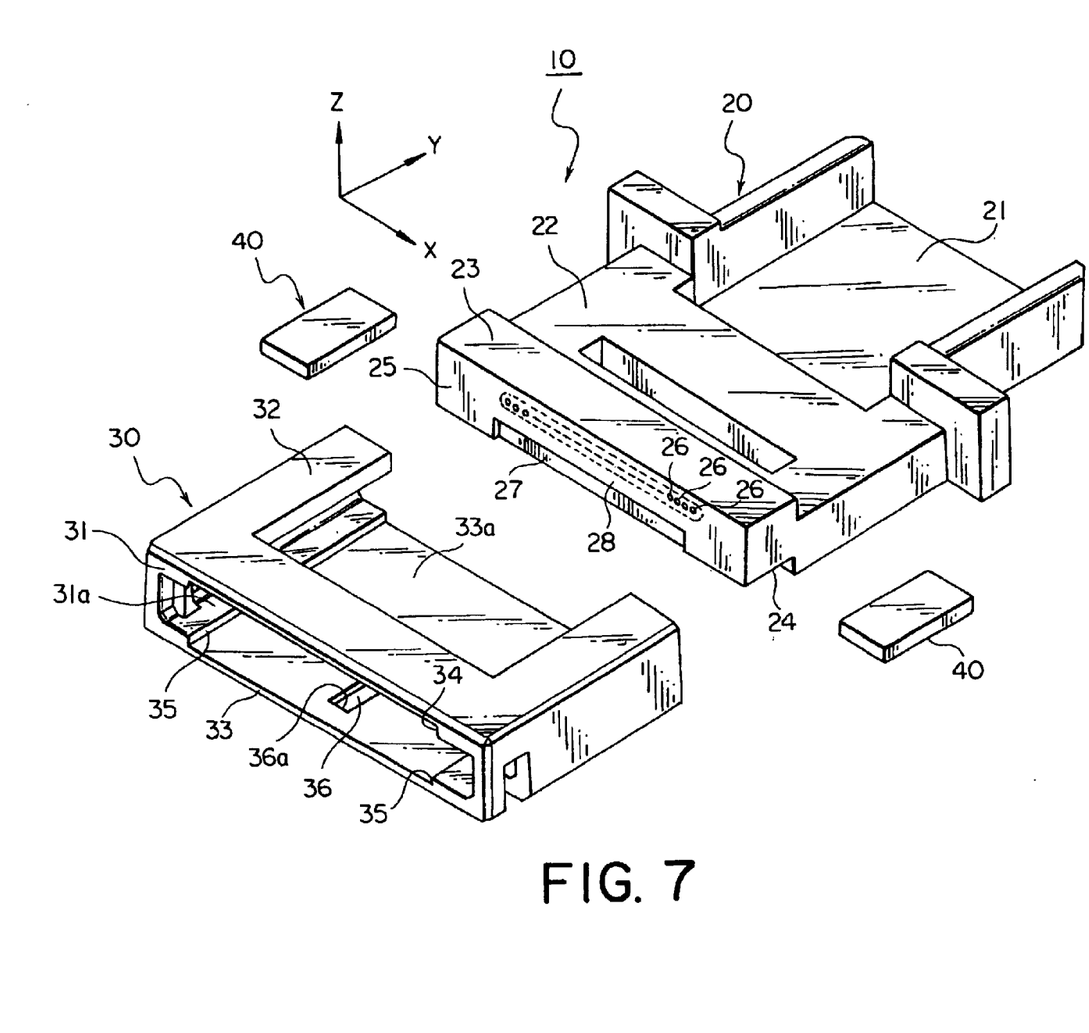
FIG. 7 is an exploded, perspective view of the connector body of FIG. 5.

As shown in FIGS. 6 and 7, the rear part 20 has a mounting portion 21, which is depressed and communicates with a rear end of the rear part 20. The mounting portion 21 continues to a supporter portion 22, which has a flat upper surface for suitably supporting the optical fibers 200 as seen in FIG. 1. The supporter portion 22 is connected to an arranging portion 23, which constitutes a front portion of the rear part 20. Because the bottom of the arranging portion 23 is positioned higher than the bottom of the supporter portion 22, a recess 24 is formed at the bottom of the arranging portion 23.

As seen from FIG. 7, the arranging portion 23 is provided with a plurality of through holes 26. Each of the through holes 26 extends in a Y-direction. The height or the vertical position of each through hole 26 is just above the upper surface of the supporter portion 22, and each through hole 26 connects between the front end 25 and the rear end of the arranging portion 23.

In this embodiment, each of the through holes 26 has a diameter slightly larger than the outer diameter of the optical fiber 200 and suitably supports the outer periphery of corresponding optical fiber 200. Specifically, the outer diameter of the optical fiber 200 is 0.125 mm, while the inner diameter of the through hole 26 is 0.14 mm. The through holes 26 are arranged on one line. All of the through holes 26 are arranged within a predetermined area 28 in an XZ plane defined by X- and Z-direction, both of which are perpendicular to the Y-direction and which are perpendicular to each other. The predetermined area 28 has a first area size, which is explained in detail afterwards. The predetermined area 28 is not a total area of the through holes 26 but a single closed area surrounding all of the through holes 26.

In the front end 25 of the arranging portion 23, a guide recess 27 is formed. The guide recess 27 extends in the X-direction and is positioned below the through holes 26. In this embodiment, the guide recess 27 continues to the bottom of the arranging portion 23, namely, the recess 24.

Figure 2:
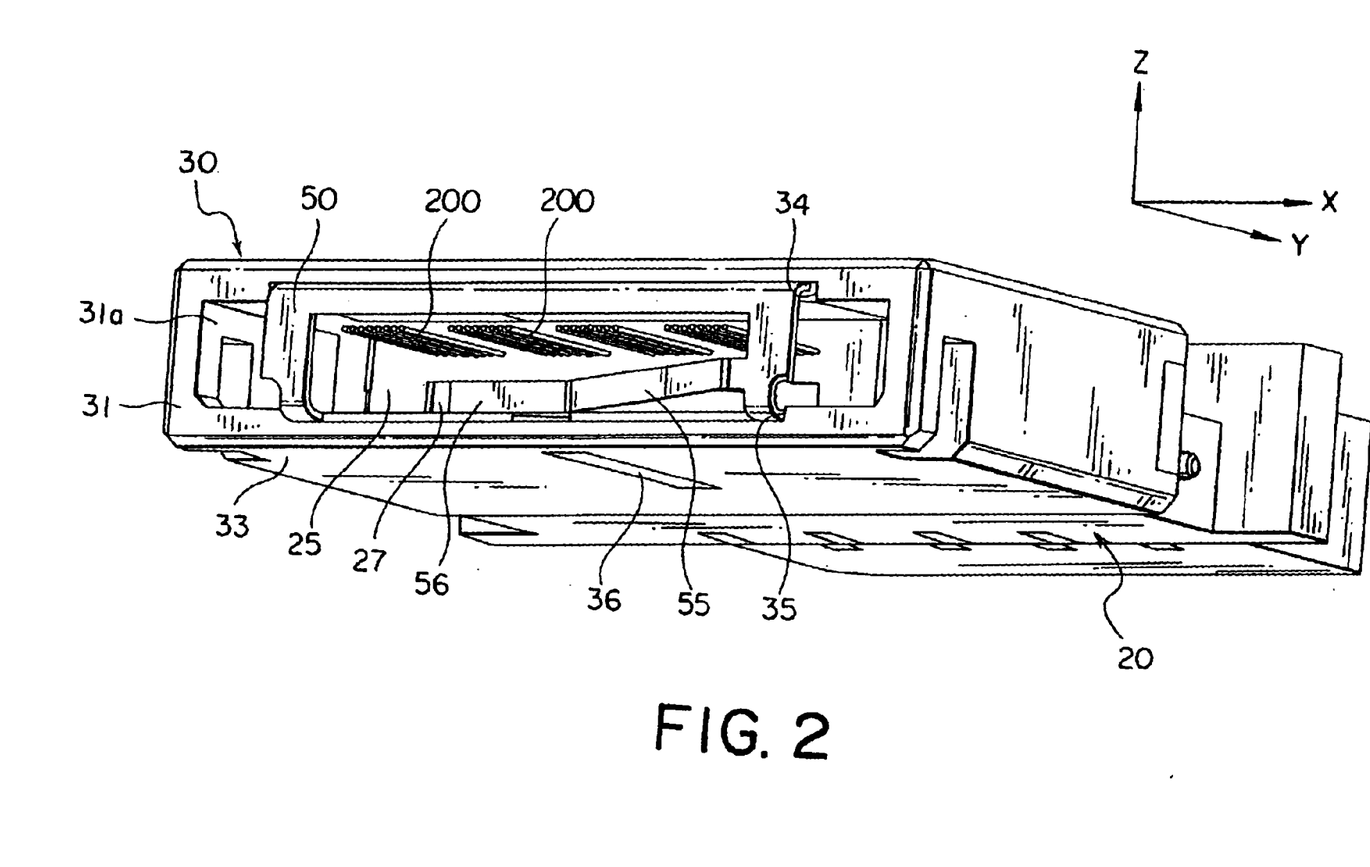
FIG. 2 is a perspective view from the bottom, showing the optical fiber connector of FIG. 1.
Figure 3:
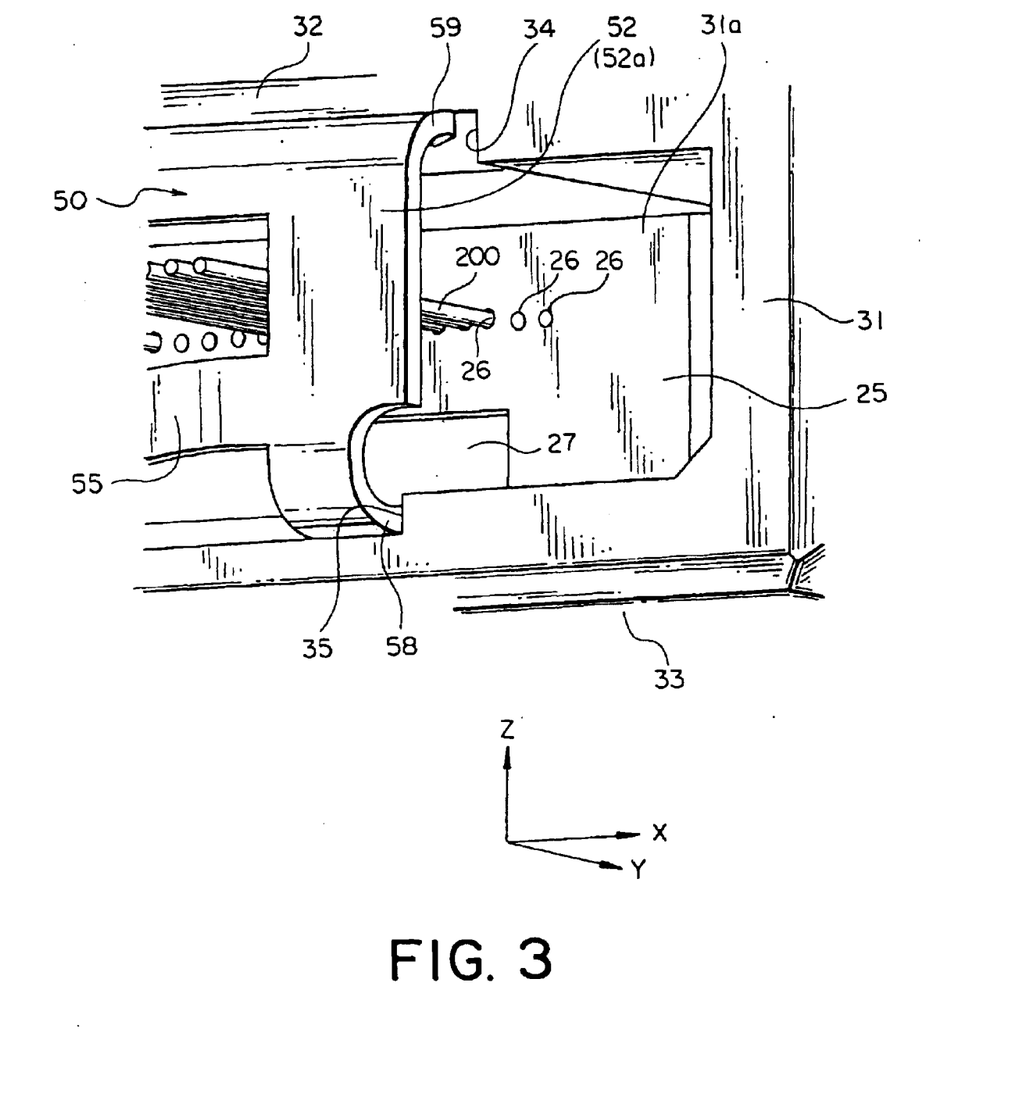
FIG. 3 is a partial, enlarged, perspective view from a side, showing a front end portion of the optical fiber connector of FIG. 1.
Figure 5:
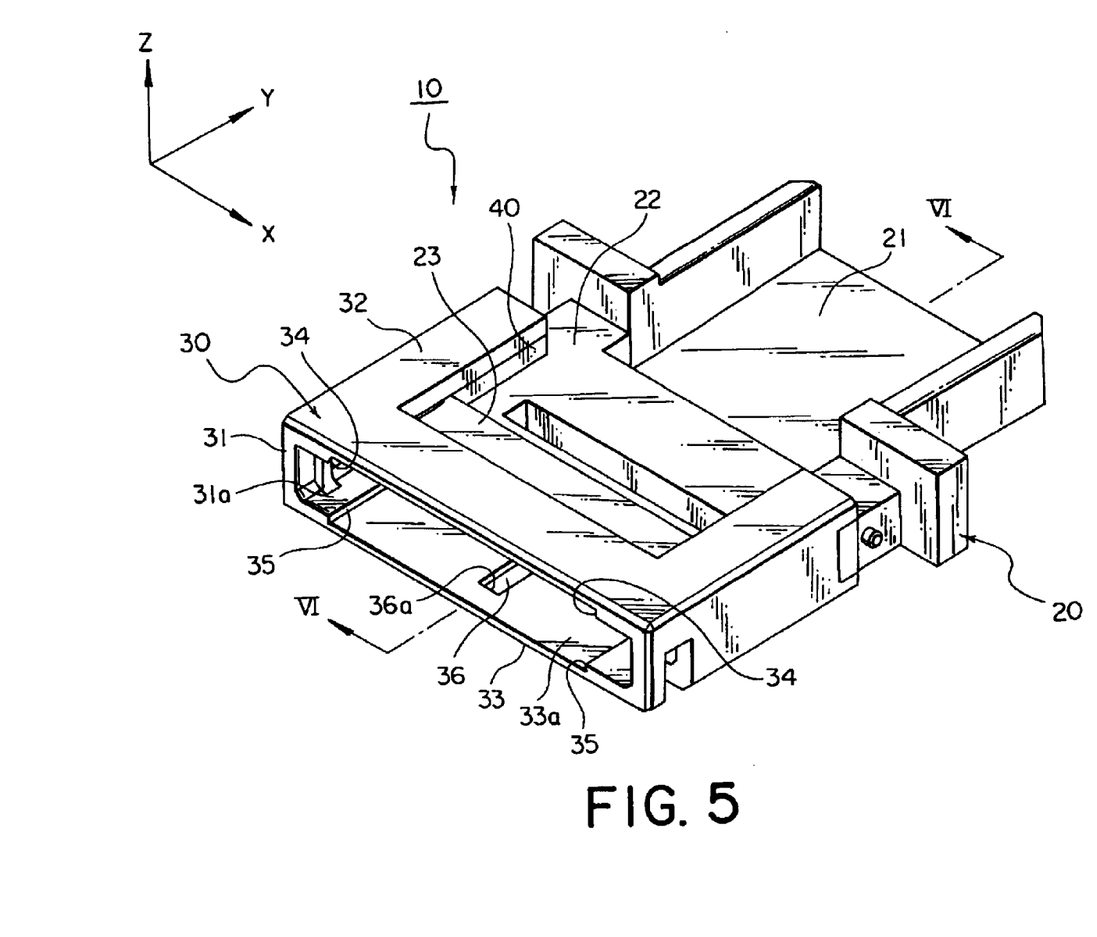
FIG. 5 is a perspective view showing a connector body included in the optical fiber connector of FIG. 1.

As shown in FIGS. 5 to 7, the front part 30 has a front end portion 31, which defines a first opening 31a. By the first opening 31a, the front end portion 31 and the rear end portion of the front part 30 communicate with each other. Therefore, under the combined state of the connector body 10, the front end 25 of the arranging portion 23 can be seen through the first opening 31a from the front side of the front part 30, as shown in FIG. 2.

In detail, as shown in FIGS. 5 to 7, the front part 30 has upper and lower portions 32, 33. The upper portion 32 has a C-like shape, while the lower portion 33 has a plate-like shape. On the lower surface of the upper portion 32, a pair of steps 34 is formed. The steps 34 continue from the front end portion 31 to a space surrounded by the C-like shape of the upper portion 32. On the upper surface 33a of the lower portion 33, another pair of steps 35 is formed. The steps 35 continue from the front end portion 31 to the rear end portion of the front part 30. In the lower portion 33, an elongated, rectangular hole 36 is formed. The hole 36 extends in the Y-direction and has a front wall 36a.

The connector body 10 is manufactured by inserting the rear part 20 into the front part 30, followed by further inserting the supplementary pieces 40 into gaps between the rear part 20 and the front part 30, as shown in FIGS. 5 and 6. The front end 25 of the arranging portion 23 is positioned apart from the front end portion 31 of the front part 30 by a predetermined distance. The predetermined distance is determined in accordance with a suitable support of the optical fibers 200. The hole 36 is positioned between the front end 25 of the arranging portion 23 and the front end portion 31 of the front part 30. Between the recess 24 and the upper surface 33a of the lower portion 33, a horizontally-elongated slit 38 is defined.

Figure 4:
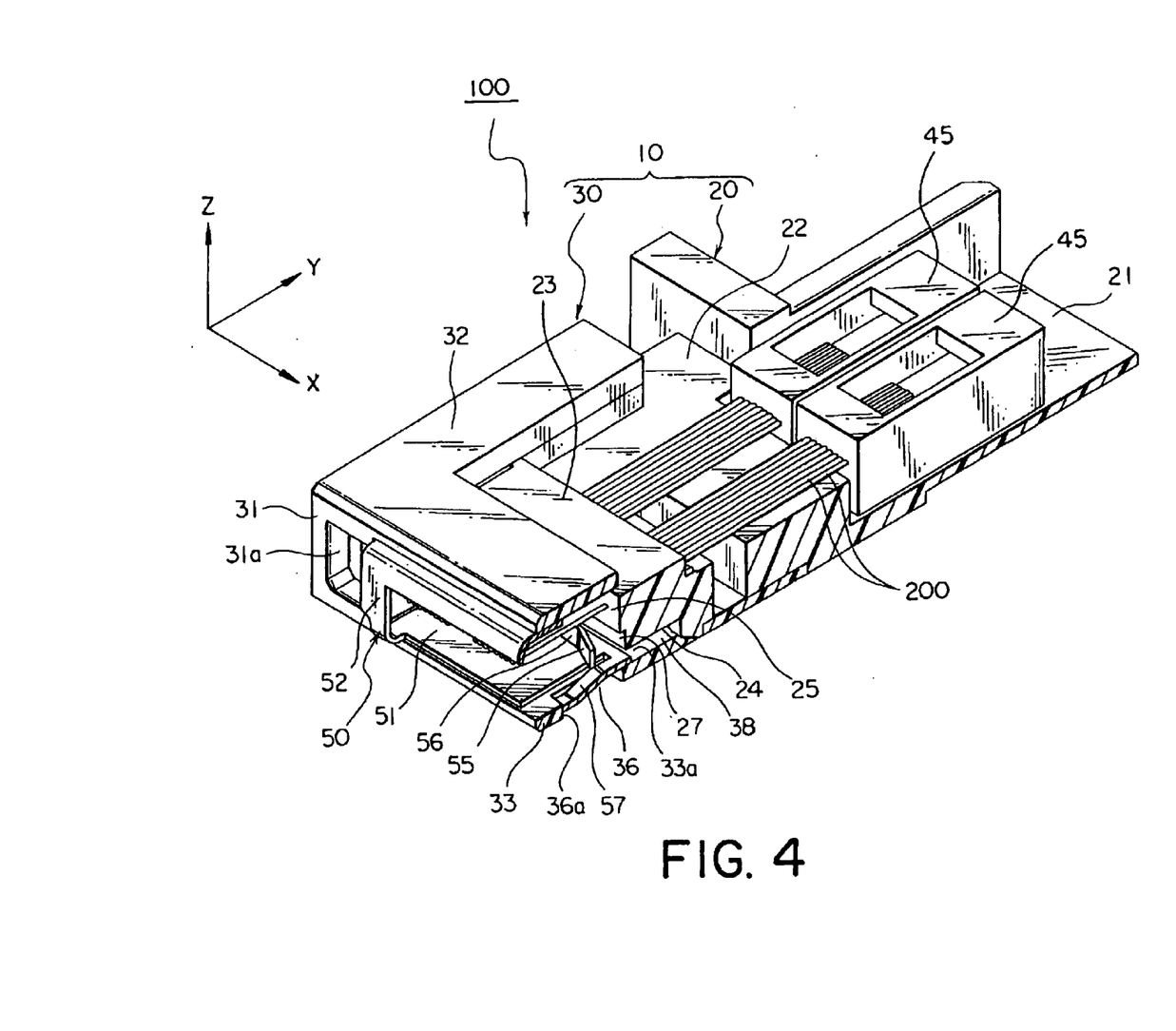
FIG. 4 is a cutaway, perspective view showing the optical fiber connector of FIG. 1, taken along lines IV—IV.

On the mounting portion 21 of the connector body 10, four clamp members 45 are mounted, as shown in FIGS. 1 and 4. Each of the clamp members 45 clamps one tape fiber, which consists of eight optical fibers 200 as explained above. For example, the detail structure of clamp member 45 is illustrated in JP-A 2001-208938 or JP-A 2000-19354, but the present invention is not limited thereto.

The vertical position of the optical fiber 200 projecting from the clamp member 45 corresponds to that of the through hole 26 of the arranging portion 23 and is just above the upper surface of the supporter portion 22. With this structure, the optical fibers 200 projecting from the respective clamp member 40 are supported by the supporter portion 22 and the respective through holes 26 of the arranging portion 23, while extending in the Y-direction. In detail, the ends of the optical fibers 200 are positioned just forwards of the front end portion 31 of the connector body 10 so that the ends of the optical fibers 200 are positioned apart from the front end 25 of the arranging portion 23.

Figure 8:
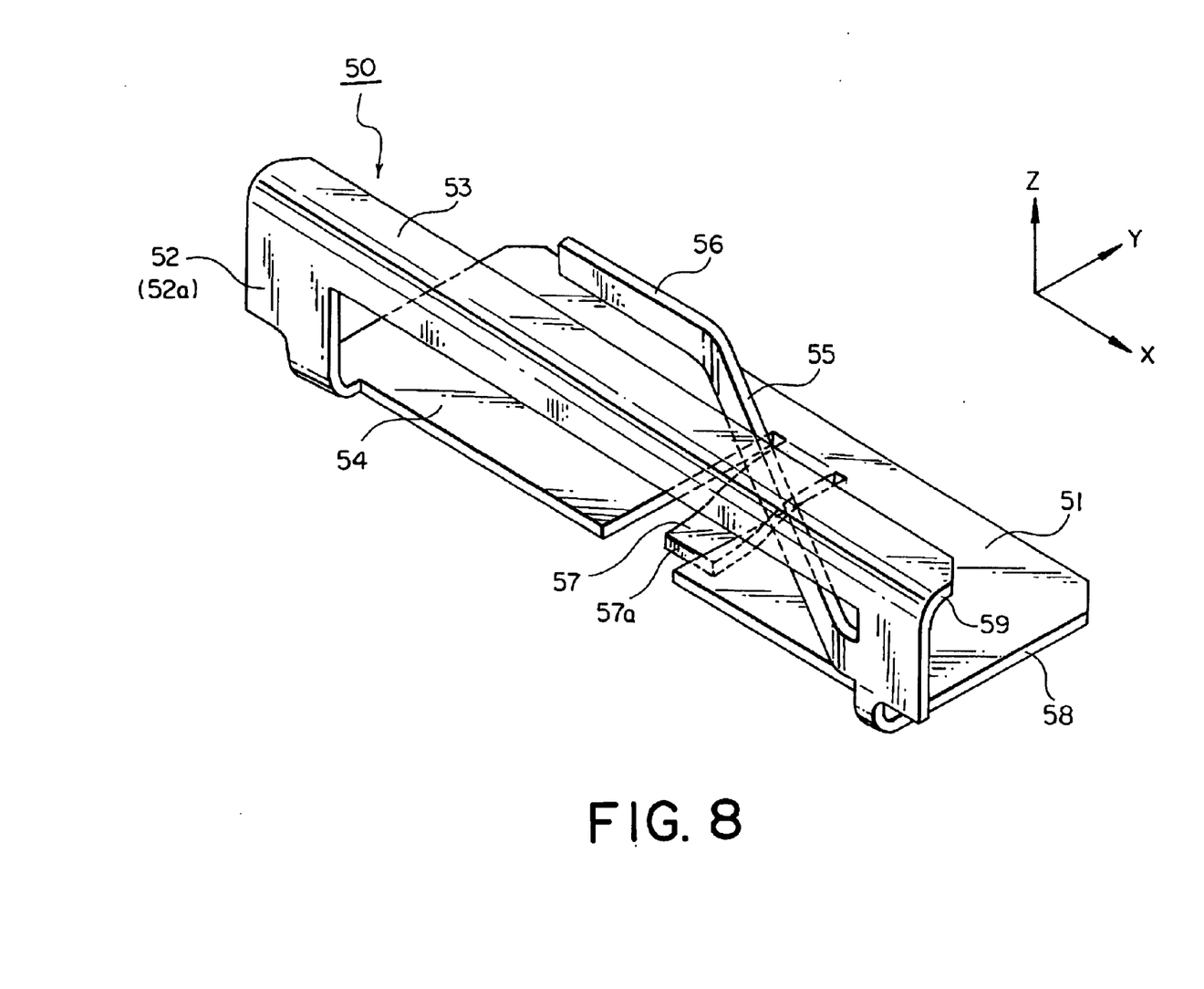
FIG. 8 is a perspective view showing a protector included in the optical fiber connector of FIG. 1.

As shown in FIGS. 1 to 4, the optical fiber connector 100 further comprises a protector 50. As shown in FIG. 8, the protector 50 has a bottom portion 51, a top portion 53 and a front portion 52 connecting them. The front end surface 52a of the front portion 52 serves as a pressed portion which is pressed for example by an adapter as disclosed in JP-A 2000-19354 upon the interconnection of the ends of the optical fibers. The bottom portion 51 and the top portion 53 extend from the front portion 52 rearwardly. In this embodiment, the top portion 53 is short in the Y-direction in comparison with the bottom portion 51. However, the top portion 53 may be made longer.

The front portion 52 is formed with a second opening 54, which is a single opening and has a second area size larger than the first area size of the predetermined area 28.

As shown in FIG. 8, from the front portion 52, a plate spring portion 55 extends in an oblique backward direction, i.e. a direction diagonal to the X and the Y-directions. The free end 56 of the plate spring portion 55 extends in the X-direction.

The bottom portion 51 of the protector 50 is provided with a tongue 57, which extends forwards in the Y-direction and has a free front end 57a.

The protector 50 is fitted within the first opening 31a, as shown in FIGS. 1 to 4. The protector 50 is slidably held by the connector body 10. As especially shown in FIG. 3, the side edges 58, 59 of the bottom and the top portions 51, 53 are guided by the steps 35, 34 which are provided for the front part 30 of the connector body 10. As shown in FIG. 2, the free end 56 of the plate spring portion 55 is brought into contact with the guide recess 27 of the arranging portion 23 when the protector 50 is fitted with the connector body 10. As shown in FIG. 4, the tongue 57 is positioned in the hole 36.

When the disconnected state of the optical fiber connector 100 with an adapter and so on, the protector 50 is positioned at a first position which is shown in FIGS. 1 and 4. At the first position, the front end surface 52a of the protector 50 projects from the front end portion 31 of the connector body 10 and is positioned farther from the front end portion 31 than the ends of the optical fibers 200 so that the ends of the optical fibers 200 are protected by the protector 50. Specifically, in this embodiment, each optical fiber 200 projects from the front end portion 31 by 0.725 mm, while the protector 50 projects from the front end portion 31 by 0.74 mm. The protector 50 is pressed forward by the spring force of the plate spring portion 55 in cooperation with the guide recess 27 of the arranging portion 23, while the free front end 57a of the tongue 57 bumps onto the front wall 36a of the hole 36. Thus, the protector 50 is forced to be positioned at the first position.

As the optical fiber connector 100 is connected to the adapter not shown, the front end surface 52a of the protector 50 is pressed rearwards in the Y-direction and is moved rearwards until a second position. At the second position, the protector 50 is completely retracted from the front end portion 31 of the connector body 10. On the other hand, the optical fibers 200 remain while being supported by the arranging portion 23. Therefore, only the optical fibers 200 project from the front end portion 31 of the connector body 10. As the protector 50 is moved to the second position, the bottom portion 51 of the protector 50 is accommodated in the slit 38 while the side edges 58, 59 are guided by the steps 35, 34, respectively. At that time, the free end 56 slides on the guide recess 27 while the plate spring portion 55 is deformed to reserve the spring force for urging the protector 50 to move towards the first position. Therefore, when the optical fiber connector 100 is withdrawn from the adapter not shown, the protector 50 can move back to the first position from the second position. During the movement of the protector 50 between the first and second positions, the protector 50 is never in contact with the optical fibers 200 because the second opening 54 is larger than the predetermined area 28 and always surrounds the predetermined area 28.

Figure 9:
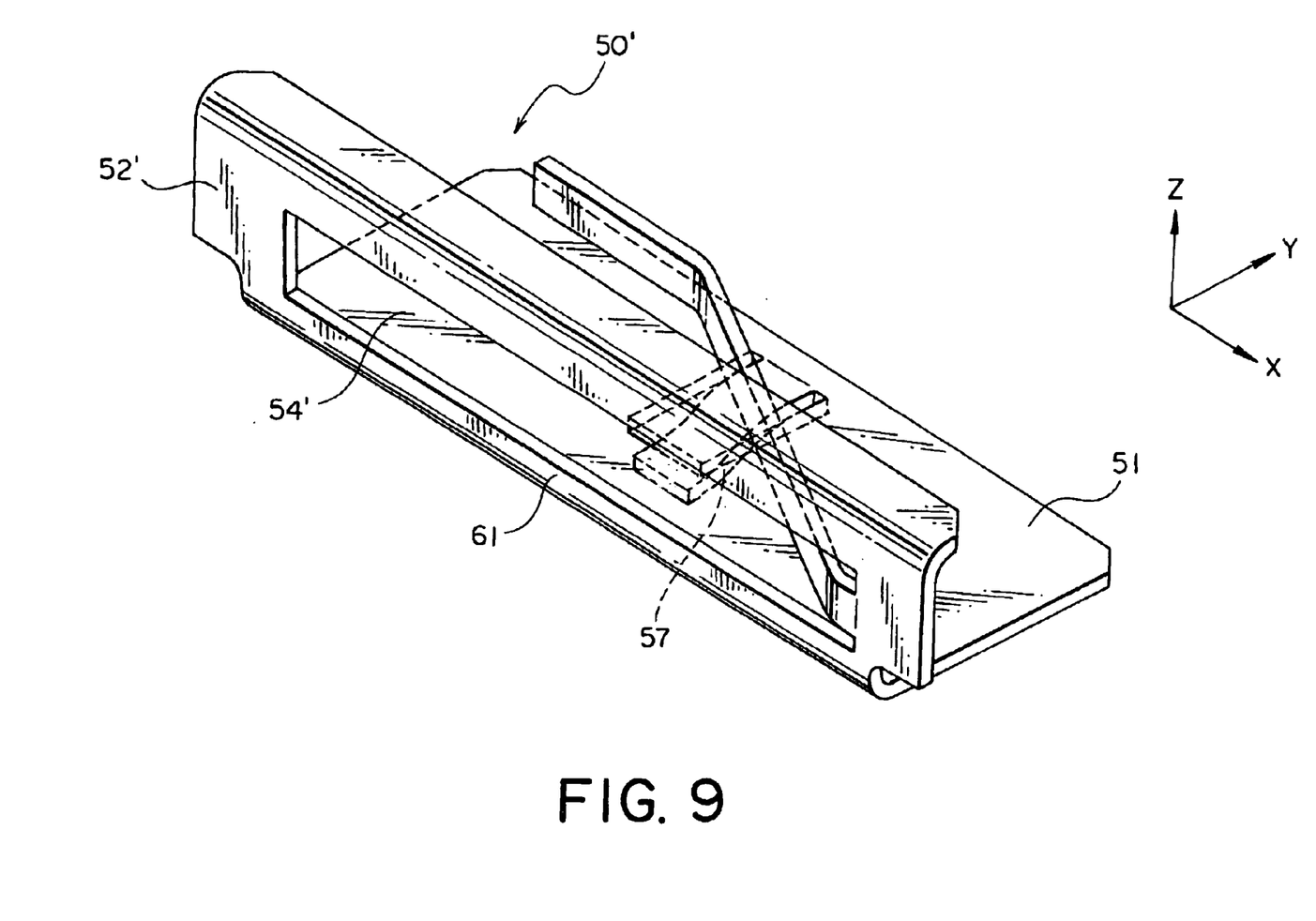
FIG. 9 is a perspective view showing a modification of the protector of FIG. 8.

In this embodiment, the second opening 54 continues to the bottom portion 51. However, as shown in FIG. 9, the protector 50' may have a front lower beam 61 so that the second opening 54' does not continue to the bottom portion 51. In the modification illustrated in FIG. 9, the tongue 57 is positioned away from the front end surface 52' in comparison with the protector 50 of FIG. 8.

What is claimed is:

1. An optical fiber connector which is able to hold optical fibers and to arrange ends of the optical fibers, the optical fiber connector comprising:

a connector body, which has a front end portion defining a first opening and comprises supporting means for supporting the optical fibers so that the optical fibers extend in a predefined direction, wherein the supporting means is positioned within a single closed predetermined area in a predefined plane perpendicular to the predefined direction, and the single closed predetermined area has a first area size in the predefined plane; and a protector, which is movably held by the connector body and is provided with a front end surface, wherein: the front end surface is formed with a second opening; the second opening has in the predefined plane a second area size larger than the first area size; and the movable range of the protector is between a first position and a second position, the first position being a position where the protector is arranged in the first opening and is surrounding by the front end portion and where the front end surface of the protector projects from the front end portion through the first opening, the second position being a position where the front end surface of the protector is retracted from the front end portion through the first opening.

2. The optical fiber connector according to claim 1, wherein, in a case where the optical fibers are held by the optical fiber connector, the ends of the optical fibers project from the front end portion through the first opening but are positioned rearwardly of the front end surface so as to be protected by the protector.

3. The optical fiber connector according to claim 1, wherein the connector body is provided with an arranging portion for arranging the optical fibers, which has the supporting means for supporting outer peripheries of the optical fibers.

4. The optical fiber connector according to claim 3, wherein the supporting means comprises a plurality of through holes for supporting the outer peripheries of the optical fibers, respectively, and each of the through holes extends in the predefined direction; and the through holes are arranged within the predetermined area in the predefined plane.

5. The optical fiber connector according to claim 3, wherein the protector is a discrete part from the arranging portion.

6. The optical fiber connector according to claim 5, wherein the arranging portion is fixed within the connector body.

7. The optical fiber connector according to claim 5, wherein the protector is made of metal.

8. The optical fiber connector according to claim 3, wherein, in a case where the optical fibers are held by the optical fiber connector, the ends of the optical fibers are positioned apart from the arranging portion.

9. The optical fiber connector according to claim 1, wherein the second opening is a single opening which surrounds the predetermined area in the predefined plane.

10. The optical fiber connector according to claim 1, wherein the front end surface is always perpendicular to the predefined direction.

11. The optical fiber connector according to claim 1, wherein the protector is able to slide in the predefined direction between the first and the second positions.

12. The optical fiber connector according to claim 1, further comprising urging means for urging the protector to be positioned at the first position.

13. The optical fiber connector according to claim 12, wherein the urging means is a plate spring which has two ends, one end of the plate spring being connected to the front end surface, the other end of the plate spring being brought into contact with a front end of the arranging portion so that the plate spring presses the protector forward.

14. The optical fiber connector according to claim 13, wherein the arranging portion is provided with a guide recess, which is formed in the front end of the arranging portion and extends in a direction perpendicular to the predefined direction, and the guide recess serves to guide the end of the plate spring by letting the end slide on the recess.

15. The optical fiber connector according to claim 14, wherein the connector body has a hole which is positioned between the front end portion and the front end of the arranging portion; the protector is provided with a tongue, which has a front free end, and wherein, when the protector is positioned at the first position, the front free end is in contact with the a front wall of the hole to prevent the protector from moving forwards beyond the first position.

16. The optical fiber connector according to claim 1, wherein, in a case where the optical fibers are held by the optical fiber connector, the second opening is never in contact with the optical fibers during the protector is moved between the first and the second positions.

17. The optical fiber connector according to claim 2, wherein, in a case where the optical fibers are held by the optical fiber connector, the second opening is never in contact with the optical fibers during the protector is moved between the first and the second positions.

18. The optical fiber connector according to claim 3, wherein, in a case where the optical fibers are held by the optical fiber connector, the second opening is never in contact with the optical fibers during the protector is moved between the first and the second positions.

19. The optical fiber connector according to claim 4, wherein, in a case where the optical fibers are held by the optical fiber connector, the second opening is never in contact with the optical fibers during the protector is moved between the first and the second positions.

20. The optical fiber connector according to claim 5, wherein, in a case where the optical fibers are held by the optical fiber connector, the second opening is never in contact with the optical fibers during the protector is moved between the first and the second positions.

21. The optical fiber connector according to claim 6, wherein, in a case where the optical fibers are held by the optical fiber connector, the second opening is never in contact with the optical fibers during the protector is moved between the first and the second positions.

22. The optical fiber connector according to claim 7, wherein, in a case where the optical fibers are held by the optical fiber connector, the second opening is never in contact with the optical fibers during the protector is moved between the first and the second positions.

23. The optical fiber connector according to claim 8, wherein, in a case where the optical fibers are held by the optical fiber connector, the second opening is never in contact with the optical fibers during the protector is moved between the first and the second positions.

24. The optical fiber connector according to claim 9, wherein, in a case where the optical fibers are held by the optical fiber connector, the second opening is never in contact with the optical fibers during the protector is moved between the first and the second positions.

* * * * *